(12) United States Patent
Derrar et al.

(10) Patent No.: US 12,556,931 B2
(45) Date of Patent: Feb. 17, 2026

(54) COMPUTER-IMPLEMENTED METHOD FOR CALL SECURITY

(71) Applicant: Elisa Oyj, Helsinki (FI)

(72) Inventors: Honain Derrar, Helsinki (FI); Jussi Ruutu, Helsinki (FI); Ville Ruutu, Helsinki (FI)

(73) Assignee: Elisa Oyj, Helsinki (FI)

( * ) Notice: Subject to any disclaimer, the term of this patent is extended or adjusted under 35 U.S.C. 154(b) by 0 days.

(21) Appl. No.: 18/860,229

(22) PCT Filed: May 24, 2023

(86) PCT No.: PCT/FI2023/050290
§ 371 (c)(1),
(2) Date: Oct. 25, 2024

(87) PCT Pub. No.: WO2023/233071
PCT Pub. Date: Dec. 7, 2023

(65) Prior Publication Data
US 2025/0113199 A1  Apr. 3, 2025

(30) Foreign Application Priority Data

Jun. 1, 2022 (FI) .................................. 20225479

(51) Int. Cl.
*H04W 12/65* (2021.01)
*G06F 21/62* (2013.01)
(Continued)

(52) U.S. Cl.
CPC ........ *H04W 12/65* (2021.01); *G06F 21/6245* (2013.01); *G10L 15/22* (2013.01);
(Continued)

(58) Field of Classification Search
CPC ..... G10L 15/20; G10L 15/22; G06F 2218/12; G06F 21/30; G06F 21/6245;
(Continued)

(56) References Cited

U.S. PATENT DOCUMENTS 8,543,834 B1 * 9/2013 Barra ..................... G06F 21/32
726/16
9,304,736 B1 * 4/2016 Whiteley ................ G06F 3/167
(Continued)

FOREIGN PATENT DOCUMENTS

CA     3007707 A1    12/2019
CN   111951823 B  *  6/2024  ........... G06F 18/214
(Continued)

OTHER PUBLICATIONS

International Preliminary Report on Patentability—Chapter II (International Preliminary Examination Report) for International Application No. PCT/FI2023/050290, completion date of Sep. 9, 2024.
(Continued)

*Primary Examiner* — Mong-Thuy T Tran
(74) *Attorney, Agent, or Firm* — FRESH IP PLC; Michael H. Anderson (57) ABSTRACT

Disclosed herein is a computer-implemented method for call security, which includes: receiving a call from a user; identifying an environment of the user during the call using acoustic scene classification; comparing the identified environment to a preconfigured environment whitelist; and in response to at least the preconfigured environment whitelist not comprising the identified environment, performing at least one security policy action.

11 Claims, 6 Drawing Sheets

(51) Int. Cl.
 *G10L 15/22* (2006.01)
 *H04L 9/40* (2022.01)
 *H04M 3/436* (2006.01)

(52) U.S. Cl.
 CPC .......... *H04L 63/08* (2013.01); *H04M 3/4365* (2013.01); *H04L 2463/082* (2013.01)

(58) Field of Classification Search
 CPC . H04M 3/4365; H04M 3/4936; H04W 12/65; H04L 2463/082
 See application file for complete search history.

(56) References Cited

U.S. PATENT DOCUMENTS

| | | | |
|---|---|---|---|
| 9,922,646 | B1 | 3/2018 | Blanksteen |
| 10,553,235 | B2* | 2/2020 | Bryan ................. G10L 21/0364 |
| 10,713,002 | B1 | 7/2020 | Alamah et al. |
| 10,803,859 | B1 | 10/2020 | Williams et al. |
| 2013/0304478 | A1 | 11/2013 | Sun et al. |
| 2017/0039388 | A1* | 2/2017 | Vas ....................... H04L 63/107 |
| 2018/0084110 | A1* | 3/2018 | Fraizer ................ H04L 63/0421 |
| 2019/0013038 | A1 | 1/2019 | Thomson et al. |
| 2020/0162501 | A1* | 5/2020 | Steele .................. G06F 21/6245 |
| 2021/0084034 | A1* | 3/2021 | Gadwale ............. H04L 63/0861 |
| 2022/0020388 | A1* | 1/2022 | Trim ..................... H04M 3/568 |
| 2022/0028397 | A1* | 1/2022 | Thomson ................ G10L 15/26 |
| 2022/0374130 | A1* | 11/2022 | Pu ........................ G06F 1/3209 |
| 2023/0139140 | A1* | 5/2023 | Mamkina ................ G10L 15/01 704/250 |

FOREIGN PATENT DOCUMENTS

| | | | |
|---|---|---|---|
| EP | 3796325 A1 | 3/2021 | |
| WO | WO-2021023667 A1 * | 2/2021 | ............ H04S 1/005 |

OTHER PUBLICATIONS

International Search Report and Written Opinion for International Application No. PCT/FI2023/050290, mailing date of Aug. 16, 2023.
Written Opinion of the International Preliminary Examining Authority for International Application No. PCT/FI2023/050290, mailing date of Jan. 5, 2024.
Search Report for FI Patent Application 20225479, mailing date of Dec. 23, 2022.
Office Action for FI Patent Application 20225479, mailing date of Dec. 23, 2022.
Office Action for FI Patent Application 20225479, mailing date of Apr. 4, 2024.
Karapanos et al., Sound-Proof: Usable Two-Factor Authentication Based on Ambient Sound, USENIX Association, 24th USENIX Security Symposium, pp. 483-498, Aug. 2015, ISBN 978-1-939133-11-3.
Search Report for FI Application 20225479, mailing date of Dec. 23, 2022.
Office Action for FI Application 20225479, mailing date of Dec. 23, 2022.
Office Action for FI Application 20225479, mailing date of Apr. 4, 2024.

* cited by examiner

COMPUTER-IMPLEMENTED METHOD FOR CALL SECURITY

TECHNICAL FIELD

The present disclosure relates to call processing, and more particularly to a computer-implemented method for call security, a computing device, and a computer program product.

BACKGROUND

An increasing number of organizations are leveraging the power of Automatic Speech Recognition to build automated systems that handle telephone and voice-based user interactions. Users are able to handle more and more of their requests by interacting with automated voice-based systems.

Automation and digitalisation raise security concerns and numerous malicious attackers try to leverage the telephone channel to access information or assets they should have no access to. This can be an even bigger concern if the automated systems lack context-awareness. Malicious attacks include but are not limited to, impersonating a customer by calling using a phone line that belongs to them, or eavesdropping on phone conversations in public spaces.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

It is an objective to provide a computer-implemented method for call security, a computing device, and a computer program product. The foregoing and other objectives are achieved by the features of the independent claims. Further implementation forms are apparent from the dependent claims, the description and the figures.

According to a first aspect, a computer-implemented method for call security comprises: receiving a call from a user; identifying an environment of the user during the call using acoustic scene classification; comparing the identified environment to a preconfigured environment whitelist; and in response to at least the preconfigured environment whitelist not comprising the identified environment, performing at least one security policy action. The method can, for example, improve the security of call processing.

In an implementation form of the first aspect, the method further comprises: identifying a reason for the call using automatic speech recognition; determining whether the identified reason requires the user to provide sensitive information during the call; and in response to the identified reason requiring the user to provide sensitive information during the call and the preconfigured environment whitelist not comprising the identified environment, performing the at least one security policy action. The method can, for example, improve the security of call processing in situations where the user needs to provide sensitive information.

In another implementation form of the first aspect, the identifying a reason for the call using automatic speech recognition comprises: asking a question from the user about the reason for the call; obtaining speech data comprising an answer provided by the user to the question; and identifying the reason for the call based on the speech data using automatic speech recognition. The method can, for example, efficiently determine the reason for the call in an automated fashion.

In another implementation form of the first aspect, the determining whether the identified reason requires the user to provide sensitive information during the call is performed by comparing the identified reason to a preconfigured list of reasons requiring exchange of sensitive information. The method can, for example, efficiently determine whether the user needs to provide sensitive information during the call.

In another implementation form of the first aspect, the at least one security policy action comprises at least one of: forwarding the call to a human; and/or performing a multi-factor authentication. The method can, for example, improve the security of the call via the aforementioned at least one security policy action.

In another implementation form of the first aspect, the method further comprises: determining whether the identified environment is a public environment; and in response to the identified reason requiring the user to provide sensitive information during the call and the identified environment being a public environment, performing at least one secondary security policy action. The method can, for example, improve the security of the call even in situations where the identified environment is on the environment whitelist.

In another implementation form of the first aspect, the at least one secondary security policy action comprises at least one of: providing a warning to the user; and/or providing the user a call-back option. The method can, for example, improve the security of the call via the aforementioned at least one secondary security policy action even in situations where the identified environment is on the environment whitelist.

In another implementation form of the first aspect, the determining whether the identified environment is a public environment is performed by comparing the identified environment to a preconfigured list of public environments. The method can, for example, efficiently determine whether the identified environment is a public environment.

In another implementation form of the first aspect, the method further comprises, in response to the preconfigured environment whitelist comprising the identified environment, proceeding to process the call without performing the at least one security policy action. The method can, for example, efficiently process calls when the environment whitelist comprises the identified environment.

In another implementation form of the first aspect, the preconfigured environment whitelist comprises environments approved by the user and/or environments approved by a service provider. The method can, for example, take into account environments approved by the user and/or by the service provider.

According to a second aspect, a computing device comprises at least one processor and at least one memory including computer program code, the at least one memory and the computer program code being configured to, with the at least one processor, cause the computing device to perform the method according to the first aspect.

According to a third aspect, a computer program product comprises program code configured to perform the method according to the first aspect when the computer program product is executed on a computer.

Many of the attendant features will be more readily appreciated as they become better understood by reference to the following detailed description considered in connection with the accompanying drawings.

DESCRIPTION OF THE DRAWINGS

In the following, example embodiments are described in more detail with reference to the attached figures and drawings, in which.

In the following, like reference numerals are used to designate like parts in the accompanying drawings.

DETAILED DESCRIPTION

In the following description, reference is made to the accompanying drawings, which form part of the disclosure, and in which are shown, by way of illustration, specific aspects in which the present disclosure may be placed. It is understood that other aspects may be utilised, and structural or logical changes may be made without departing from the scope of the present disclosure. The following detailed description, therefore, is not to be taken in a limiting sense, as the scope of the present disclosure is defined be the appended claims.

For instance, it is understood that a disclosure in connection with a described method may also hold true for a corresponding device or system configured to perform the method and vice versa. For example, if a specific method step is described, a corresponding device may include a unit to perform the described method step, even if such unit is not explicitly described or illustrated in the figures. On the other hand, for example, if a specific apparatus is described based on functional units, a corresponding method may include a step performing the described functionality, even if such step is not explicitly described or illustrated in the figures. Further, it is understood that the features of the various example aspects described herein may be combined with each other, unless specifically noted otherwise.

Figure 1:
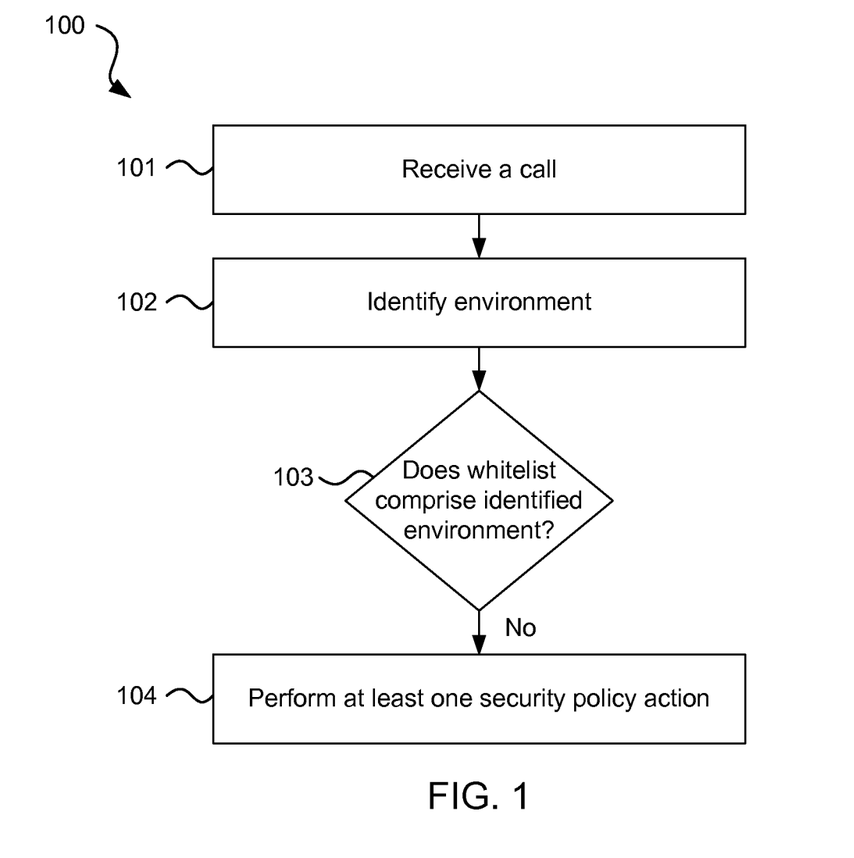
FIG. 1 illustrates a flow chart representation of a method according to an embodiment.

FIG. 1 illustrates a flow chart representation of a method according to an embodiment.

According to an embodiment, a computer-implemented method 100 for call security comprises receiving 101 a call from a user.

The call may also be referred to as a phone call, a voice call, or similar.

The method 100 may further comprise identifying 102 an environment of the user during the call using acoustic scene classification (ASC).

The environment may also be referred to as an ASC class, a context, an acoustic scene, a location, or similar.

The method 100 may further comprise comparing 103 the identified environment to a preconfigured environment whitelist.

The preconfigured environment whitelist may also be referred to as a preconfigured environment database, an environment database, a whitelist environment database, or similar. The preconfigured environment whitelist may comprise a plurality of approved environments.

The method 100 may further comprise, in response to at least the preconfigured environment whitelist not comprising the identified environment, performing 104 at least one security policy action.

The at least one security policy action may also be referred to as a security action, a security measure, a security policy measure, or similar.

Before the at least one security policy action is performed, additional processing, such as checking various other conditions, may be performed. Some examples of such additional processing are disclosed in the embodiments herein. Thus, at least one security policy action may be performed in response to further conditions being met in addition to the preconfigured environment whitelist not comprising the identified environment.

According to an embodiment, the preconfigured environment whitelist comprises environments approved by the user and/or environments approved by a service provider.

A service provider may correspond to, for example, an entity utilising the method. For example, the service provider may be a company and the user may be a customer of that company.

The whitelist may comprise, for example, environments approved by the user when onboarding the user to a service. For example, when the user registers to a service, the user may approve some environments, and these approved environments can be saved in the whitelist. Alternatively or additionally, a service provider may provide environments to the whitelist.

According to an embodiment, the at least one security policy action comprises at least one of: forwarding the call to a human and/or performing a multi-factor authentication.

If the call is forwarded to a human, the human can assess the situation and determine whether the call is malicious and potentially require additional factor authentication.

At least some embodiments disclosed herein can increase the security of automatic speech recognition (ASR)-based systems that interact with users.

At least some embodiments disclosed herein can increase user's confidence in using a voice-based systems and therefore the user experience.

At least some embodiments disclosed herein can increase user awareness about the risks of sharing sensitive data in risky environments.

At least some embodiments disclosed herein can allow the collection of context data that could be useful for the development of new services and products.

It is worth noting that the method 100 could be extended to work with human agents in a similar fashion. For example, acoustic scene classification could be used to flag risky calls or recommend reminders to users to actual human customer-service workers.

The output of the acoustic scene classification could also be fed to other systems, such as an anomaly detection system, possibly based on machine learning algorithms, that could use the acoustic scene category alone or in combination with other data sources as a part of its efforts to detect potential anomalies in the calls received by a service provider.

In some embodiments, the method 100 may further comprise comparing the identified environment to a list of high-risk environments. The method 100 may further comprise, in response to the list of high-risk environments comprising the identified environment, performing the at least one security policy action. The list of high-risk environments can be maintained by, for example, the service provider providing the service to the user. The list of high-risk environments can comprise, for example, environments that are known to have been the origin of a large number of malicious calls. Thus, the environments on the list of high-risk environments can be treated like environments outside of the customer's approved environments.

Figure 2:
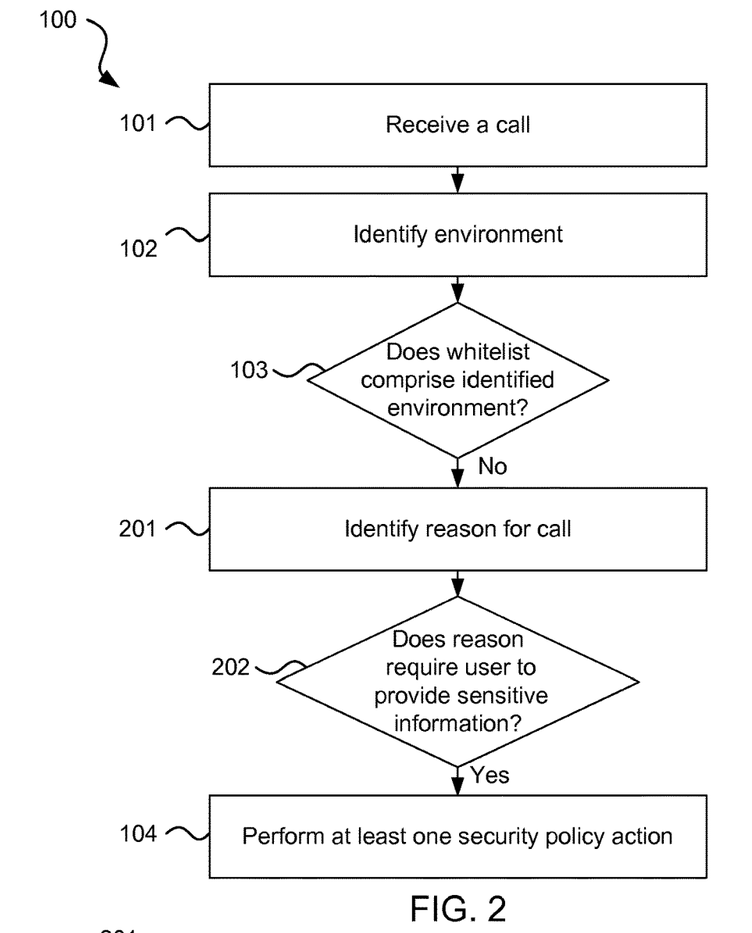
FIG. 2 illustrates a flow chart representation of a method according to another embodiment.

FIG. 2 illustrates a flow chart representation of a method according to another embodiment.

According to an embodiment, the method 100 further comprises identifying 201 a reason for the call using ASR, determining 202 whether the identified reason requires the user to provide sensitive information during the call, and in response to the identified reason requiring the user to provide sensitive information during the call and the preconfigured environment whitelist not comprising the identified environment, performing 104 the at least one security policy action.

The determining 202 whether the identified reason requires the user to provide sensitive information during the call may be performed by, for example, comparing the identified reason to a preconfigured list of reasons requiring exchange of sensitive information. This list can be maintained by, for example, the service provider.

The sensitive information may comprise, for example, sensitive personal information and/or confidential information, such as a personal identity number, or any other information that should not be disclosed in public.

The reason for the call may also be referred to as a contact reason or similar.

The various processing operations disclosed herein may be performed in various different orders. For example, the embodiment of FIG. 2 only illustrates an exemplary order of operations. Furthermore, at least some operations may be performed at least partially in parallel.

For example, in some embodiments, the identifying 102 the environment during the call and the identifying 201 the reason for the call may be performed first and the checks 103, 202 may be performed second. The identifying 102 the environment during the call may be performed before the identifying 201 the reason for the call, or the identifying 201 the reason for the call may be performed before the identifying 102 the environment during the call. Similarly, the checks 103, 202 may be performed in any order.

In some embodiments, the identifying 102 the environment during the call may be performed in parallel with the identifying 201 the reason for the call. For example, an ASR system responsible for interacting with the user can determine the reason for the call by identifying contents of the caller's speech and asking questions. In parallel, the ASR system can forward a copy of the audio stream to an ASC system that determines the environment of the call.

Figure 3:
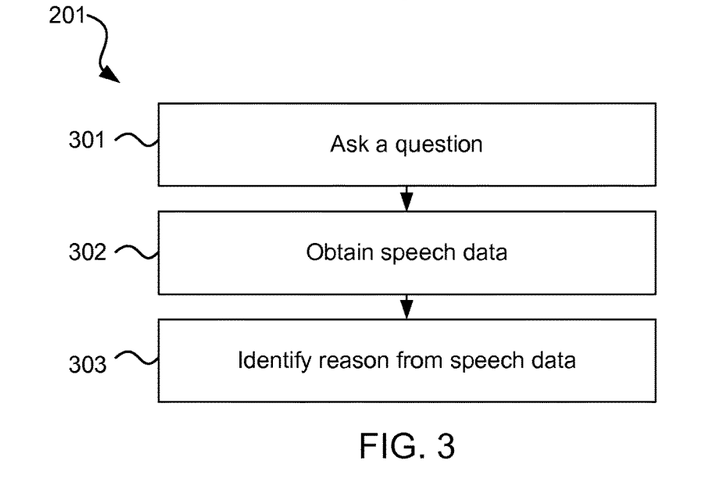
FIG. 3 illustrates a flow chart representation of a method according to another embodiment.

FIG. 3 illustrates a flow chart representation of a method according to another embodiment.

According to an embodiment, the identifying 201 a reason for the call using automatic speech recognition comprises asking 301 a question from the user about the reason for the call, obtaining 302 speech data comprising an answer provided by the user to the question, and identifying 303 the reason for the call based on the speech data using automatic speech recognition.

According to an embodiment, the determining 202 whether the identified reason requires the user to provide sensitive information during the call is performed by comparing the identified reason to a preconfigured list of reasons requiring exchange of sensitive information.

The identifying 303 the reason for the call based on the speech data using automatic speech recognition may comprise, for example, obtaining an audio input comprising the speech data, converting the audio input into the text data using a speech-to-text conversion, and identifying the reason for the call based on the text data.

Figure 4:
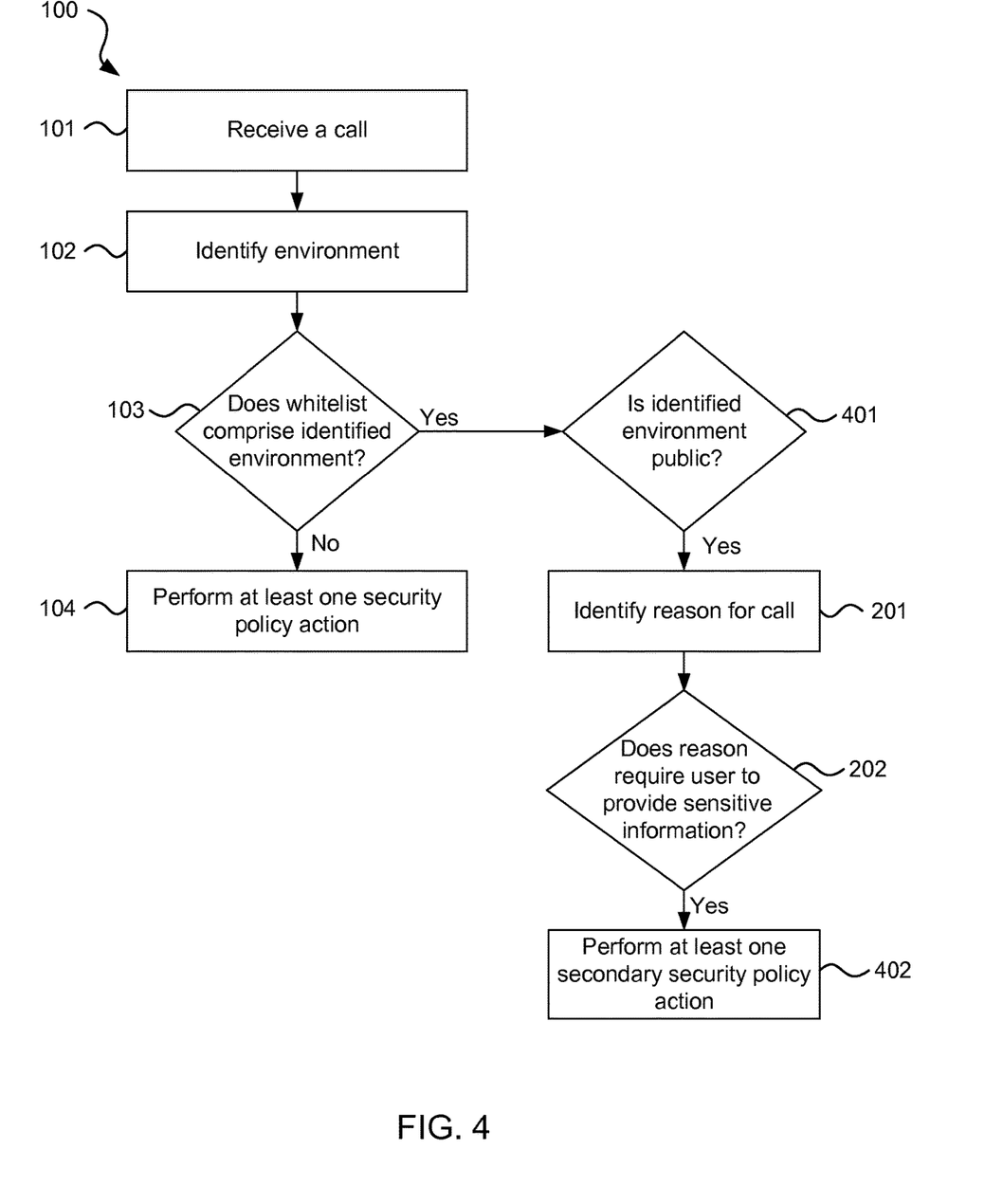
FIG. 4 illustrates a flow chart representation of a method according to another embodiment.

FIG. 4 illustrates a flow chart representation of a method according to another embodiment.

According to an embodiment, the method 100 further comprises, in response to the preconfigured environment whitelist comprising the identified environment, proceeding to process the call without performing 104 the at least one security policy action.

The embodiment of FIG. 4 illustrates other processing operations that may be performed when the whitelist comprises the identified environment. The processing operations illustrated in FIG. 4 are exemplary and, alternatively or additionally, other processing operations can also be performed.

According to an embodiment, the method 100 further comprises determining 401 whether the identified environment is a public environment and, in response to the identified reason requiring the user to provide sensitive information during the call and the identified environment being a public environment, performing 402 at least one secondary security policy action.

According to an embodiment, the at least one secondary security policy action comprises at least one of: providing a warning to the user and/or providing the user a call-back option.

The warning provided to the user may remind the user about the potential risks of sharing sensitive information while in a public space. Additionally or alternatively, the user can be offered a call-back option for the service provider to call the customer back at a more appropriate time.

According to an embodiment, the determining 401 whether the identified environment is a public environment is performed by comparing the identified environment to a preconfigured list of public environments.

The preconfigured list of public environments may comprise any number of public environments, such as a street, an airport, a train station etc.

If the identified environment is not public and/or the identified reason does not require the user to provide person information during the call, the processing of the call may continue without performing the secondary security policy action.

In the following, an example of a usage of an embodiment of the method 100 is provided.

A user calls a telecom operator to inquire about existing bills. The user's environment whitelist comprises an office and home.

The telecom operator has implemented a system utilising the method 100 to deal with customer requests. The company has listed the following outdoor contexts as public environments to warn the user: a train station and an airport.

The system asks questions from the user to determine the contact reason. For example, "Does your request concern existing bills?", which requires the user to provide sensitive information.

In a parallel fashion, a copy of the user's audio signal is forwarded to the ASC system that determines that the caller is calling from an airport.

Combining the contact reason and the call context together with information about approved customer environments (context which the customer mentioned they are likely to call from) and information on public environments, the system makes a decision on security measures to take. Because the airport context was not mentioned in the list of authorized customer contexts, the call is forwarded to a human agent who will continue the interaction.

In case the context was, say an office, meaning, in the list of the user's authorized contexts, the interaction would have proceeded in a similar fashion as before the implementation of the system.

In case the case was approved by the user but was identified as a public environment such as an airport, the system would remind the user about the risks of sharing sensitive information in public places and would offer a call-back option to the user.

Figure 5:
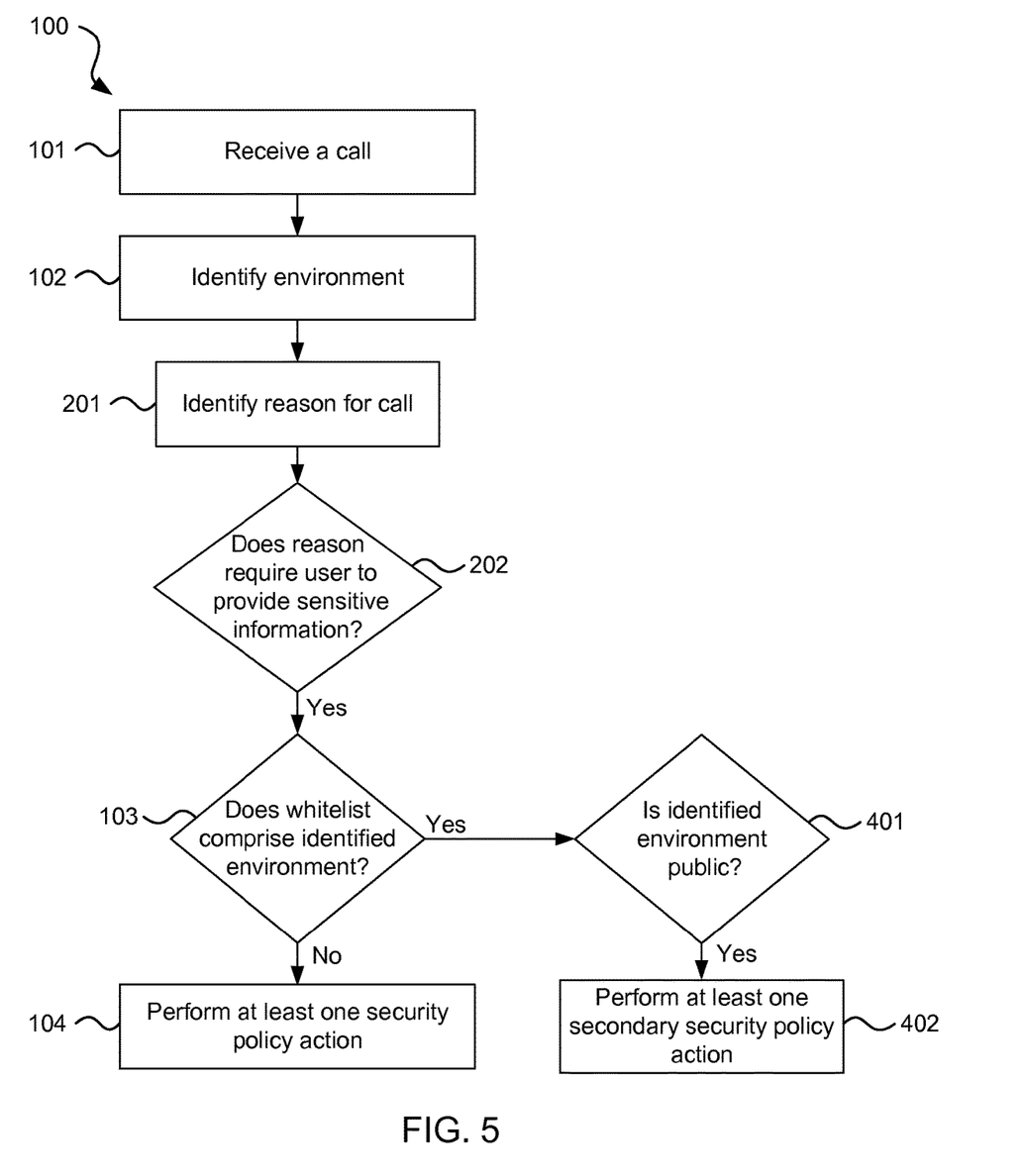
FIG. 5 illustrates a flow chart representation of a method according to another embodiment.

FIG. 5 illustrates a flow chart representation of a method according to another embodiment.

The operations of the method 100 may be performed in various different orders. For example, in the embodiment of FIG. 5, the identifying 201 a reason for the call using automatic speech recognition and determining 202 whether the identified reason requires the user to provide sensitive information during the call are performed before comparing 103 the identified environment to a preconfigured environment whitelist. In the embodiment of FIG. 4, on the other hand, the identifying 201 a reason for the call using automatic speech recognition and the determining 202 whether the identified reason requires the user to provide sensitive information during the call are performed after comparing 103 the identified environment to a preconfigured environment whitelist.

Furthermore, in the embodiment of FIG. 4, the determining 401 whether the identified environment is a public environment is performed before the determining 202 whether the identified reason requires the user to provide sensitive information during the call. Thus, the at least one secondary security policy action is performed 402 in response to the identified reason requiring the user to provide sensitive information during the call and the identified environment being a public environment. In the embodiments of FIG. 2 and FIG. 5, on the other hand, determining 202 whether the identified reason requires the user to provide sensitive information during the call is performed even without determining 401 whether the identified environment is a public environment and the at least one security policy action is performed 104 in response to the identified reason requiring the user to provide sensitive information during the call and the preconfigured environment whitelist not comprising the identified environment. Still, in both embodiments of FIG. 4 and FIG. 5, at least one secondary security policy action is performed 402 in response to the identified reason requiring the user to provide sensitive information during the call and the identified environment being a public environment. Thus, the order of operations disclosed herein are exemplary and the operations may be performed in various other orders also.

Figure 6:
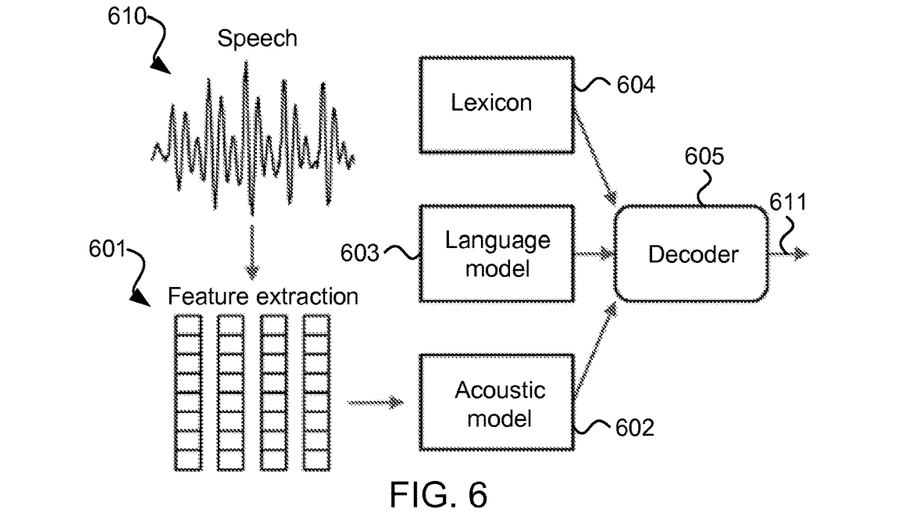
FIG. 6 illustrates a schematic representation of system modules according to an embodiment.

FIG. 6 illustrates a schematic representation of system modules according to an embodiment.

ASR systems can utilize principles from several different fields, such as signal processing, artificial intelligence, and linguistics, in order to automatically convert an audio signal comprising speech into text that corresponds to the content of the speech in the system's input signal. An embodiment of an ASR system is illustrated in FIG. 6.

An ASR system can perform feature extraction 601 on speech data 610. The extracted features can be provided to an acoustic model 602. The acoustic model 602 can comprise a statistical model that identifies sound units from an input speech signal 610 after relevant features have been extracted from it.

A decoder 605 can deduce the text based on information from various components, such as the acoustic model 602, a language model 603, and a lexicon 604. The language model 603 can comprise a statistical model that scores how likely words are to occur with each other in a given language. The lexicon 604 can comprise a pronunciation dictionary that indicates how words are constructed from sound units.

The acoustic model 602 may be produced using audio-text pairs where the text part corresponds to the speech in the audio signal. The language model 603 can be produced using textual resources for the target language, like English, while the lexicon 604 can be created with the help of linguists.

The embodiment of FIG. 6 is only an example of an ASR system. Alternatively, the ASR system can be implemented in various alternative ways.

Figure 7:
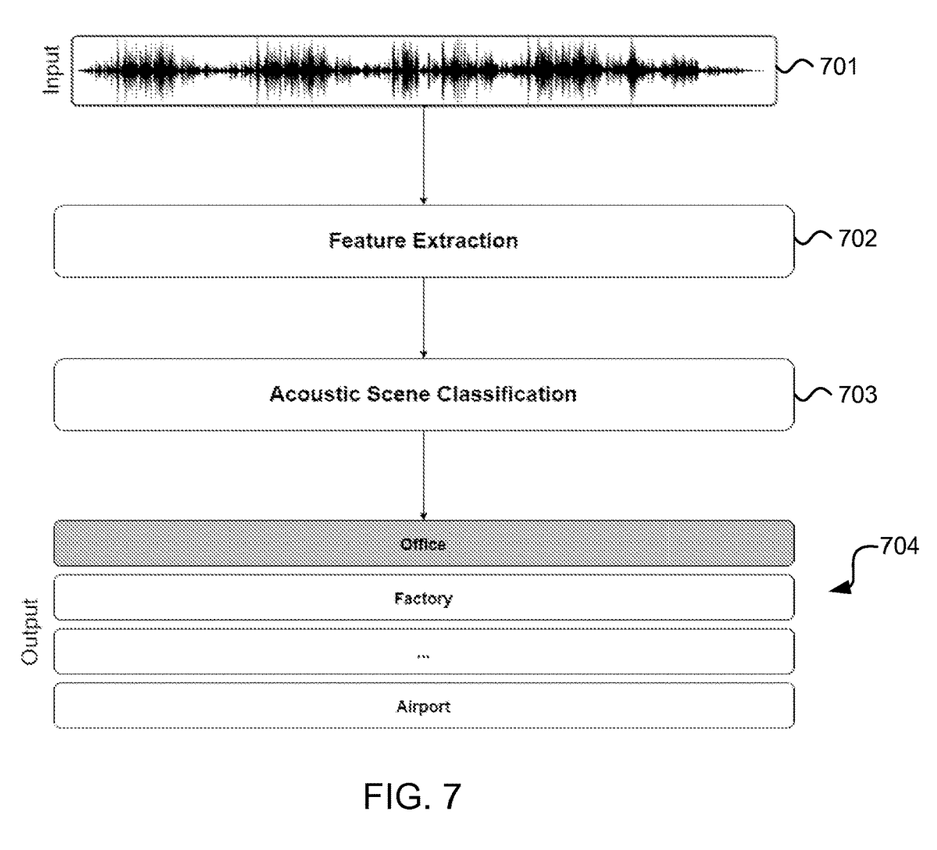
FIG. 7 illustrates a schematic representation of acoustic scene classification according to an embodiment.

FIG. 7 illustrates a schematic representation of acoustic scene classification according to an embodiment.

ASC can classify audio samples to categories corresponding to the environment in which the audio sample was recorded. For instance, an audio sample could be recorded in an office, in an airport, or in a factory. One of the objectives of ASC can be to provide context-awareness to automated audio systems.

The input of an ASC pipeline is an audio signal 701. Before performing the ASC operation per se, a feature extraction step 702 can be applied to the audio signal 701. This step can transform the audio signal 701 into a format that contains relevant information for the actual classification operation and could involve, for example, signal processing algorithms such as the Fast Fourier Transform (FFT) algorithm.

Once the feature extraction step 702 has been performed, the extracted features are used to perform the actual ASC operation 703. The ASC module can be a statistical model that assigns the most likely category (environment/scene) based on the input features. In the embodiment of FIG. 7, the selected acoustic scene 704 is "Office". The statistical module is typically produced using a training step by using audio-context pairs that can be collected, for instance, via human annotators.

In some embodiments, the method 100 may be implemented using various modules/components such as those disclosed herein. Alternatively, the method 100 may also be implemented using various other systems.

Figure 8:
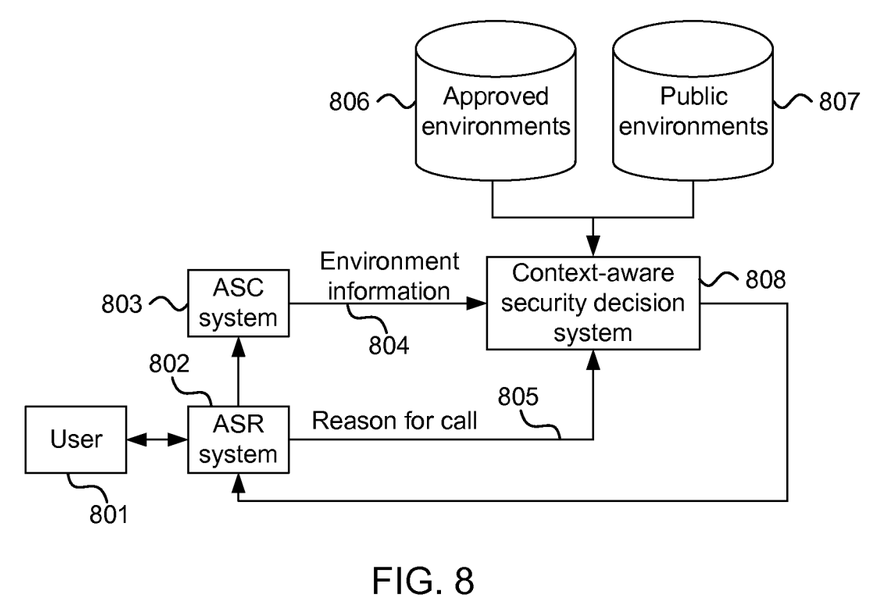
FIG. 8 illustrates a schematic representation of a system according to an embodiment.

FIG. 8 illustrates a schematic representation of a system according to an embodiment.

An ASR system 802 can receive a call from a user 801. The ASR system 802 can forward a copy of the audio stream of the call to an ASC system 803 that determines the acoustic scene (context/environment) of the call. The ASC system 803 can perform the identifying 102 the environment of the user during the call using acoustic scene classification and pass the identified environment 804 to a context-aware security decision system 808. Additionally, the ASR system 802 can perform the identifying 201 the reason for the call using automatic speech recognition and pass the identified reason 805 to the context-aware security decision system 808.

The context-aware security decision system 808 can perform the comparing 103 the identified environment to a preconfigured environment whitelist and/or determining 401 whether the identified environment is a public environment. The context-aware security decision system 808 can utilise the method 100 disclosed herein.

The context-aware security decision system 808 can utilise, for example, a database of approved environments 806 and/or a database of public environments 807. The context-aware security decision system 808 can perform, for example, the at least one security policy action and/or the at least one secondary security policy action. Based on these actions, functionality of the ASR system 802 can be controlled.

Figure 9:
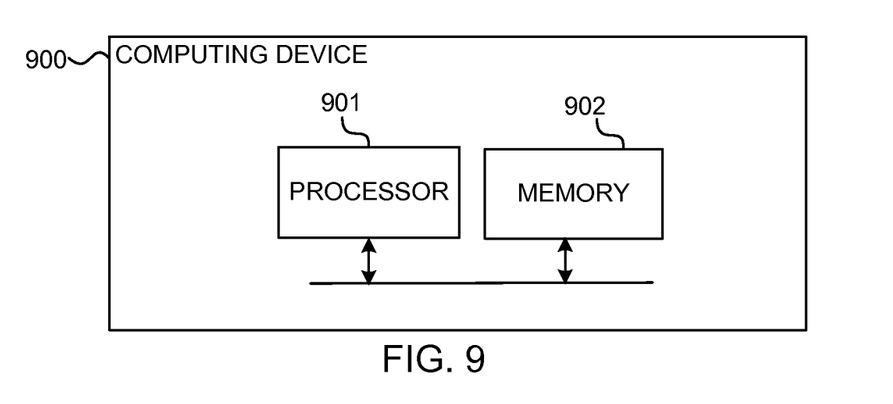
FIG. 9 illustrates a schematic representation of a computing device according to an embodiment.

FIG. 9 illustrates a schematic representation of a computing device according to an embodiment.

According to an embodiment, a computing device 900 comprises at least one processor 901 and at least one memory 902 including computer program code, the at least one memory 902 and the computer program code configured to, with the at least one processor 901, cause the computing device to perform the method 100.

The computing device 900 may comprise at least one processor 901. The at least one processor 901 may comprise, for example, one or more of various processing devices, such as a co-processor, a microprocessor, a digital signal processor (DSP), a processing circuitry with or without an accompanying DSP, or various other processing devices including integrated circuits such as, for example, an application specific integrated circuit (ASIC), a field programmable gate array (FPGA), a microprocessor unit (MCU), a hardware accelerator, a special-purpose computer chip, or the like.

The computing device 900 may further comprise a memory 902. The memory 902 may be configured to store, for example, computer programs and the like. The memory 902 may comprise one or more volatile memory devices, one or more non-volatile memory devices, and/or a combination of one or more volatile memory devices and non-volatile memory devices. For example, the memory 902 may be embodied as magnetic storage devices (such as hard disk drives, magnetic tapes, etc.), optical magnetic storage devices, and semiconductor memories (such as mask ROM, PROM (programmable ROM), EPROM (erasable PROM), flash ROM, RAM (random access memory), etc.).

The computing device 900 may further comprise other components not illustrated in the embodiment of FIG. 9. The computing device 900 may comprise, for example, an input/output bus for connecting the computing device 900 to other devices. Further, a user may control the computing device 900 via the input/output bus.

When the computing device 900 is configured to implement some functionality, some component and/or components of the computing device 900, such as the at least one processor 901 and/or the memory 902, may be configured to implement this functionality. Furthermore, when the at least one processor 901 is configured to implement some functionality, this functionality may be implemented using program code comprised, for example, in the memory.

The computing device 900 may be implemented at least partially using, for example, a computer, some other computing device, or similar.

The method 100 and/or the computing device 900 may be utilised in, for example, in a so-called voicebot. A voicebot may be configured to obtain information from users by, for example, phone and convert the voice information into text information using ASR. The method 100 may be used to improve the security of such a voicebot. The voicebot may further be configured to further process, such as classify, the text information. The voicebot can, for example, ask questions about, for example, basic information from a customer in a customer service situation over the phone, obtain the answers using ASR and the method 100, and save the information in a system. Thus, the customer service situation can be made more efficient and user experience can be improved and made more secure.

Any range or device value given herein may be extended or altered without losing the effect sought. Also any embodiment may be combined with another embodiment unless explicitly disallowed.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item may refer to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the embodiments described above may be combined with aspects of any of the other embodiments described to form further embodiments without losing the effect sought.

The term 'comprising' is used herein to mean including the method, blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A computer-implemented method for voice call security, the method comprising:
receiving a voice call from a user;
identifying an acoustic scene classification (ASC) class of the user during the voice call using acoustic scene classification;
comparing the identified ASC class to a preconfigured ASC class whitelist;
identifying a reason for the voice call using automatic speech recognition;

determining whether the identified reason requires the user to provide sensitive information during the voice call; and in response to the identified reason requiring the user to provide sensitive information during the voice call and the preconfigured ASC class whitelist not comprising the identified ASC class, performing the at least one security policy action.

2. The computer-implemented method according to claim 1, wherein the identifying a reason for the voice call using automatic speech recognition comprises:

asking a question from the user about the reason for the voice call;

obtaining speech data comprising an answer provided by the user to the question; and identifying the reason for the voice call based on the speech data using automatic speech recognition.

3. The computer-implemented method according to claim 1, wherein the determining whether the identified reason requires the user to provide sensitive information during the voice call is performed by comparing the identified reason to a preconfigured list of reasons requiring exchange of sensitive information.

4. The computer-implemented method according to claim 1, wherein the at least one security policy action comprises at least one of:

forwarding the voice call to a human; and/or performing a multi-factor authentication.

5. The computer-implemented method according to claim 1, the method further comprising:

determining whether the identified ASC class is a public ASC class; and in response to the identified reason requiring the user to provide sensitive information during the voice call and the identified ASC class being a public ASC class, performing at least one secondary security policy action.

6. The computer-implemented method according to claim 5, wherein the at least one secondary security policy action comprises at least one of:

providing a warning to the user; and/or providing the user a call-back option.

7. The computer-implemented method according to claim 5, wherein the determining whether the identified ASC class is a public ASC class is performed by comparing the identified ASC class to a preconfigured list of public ASC classes.

8. The computer-implemented method according to claim 1, the method further comprising:

in response to the preconfigured ASC class whitelist comprising the identified ASC class, proceeding to process the voice call without performing the at least one security policy action.

9. The computer-implemented method according to claim 1, wherein the preconfigured ASC class whitelist comprises ASC classes approved by the user and/or ASC classes approved by a service provider.

10. A computing device, comprising at least one processor and at least one memory including computer program code, the at least one memory and the computer program code configured to, with the at least one processor, cause the computing device to perform the method according to claim 1.

11. A non-transitory computer-readable storage medium, having instructions stored thereon that, when executed by a computing device, cause the computing device to perform operations, the operations comprising the method according to claim 1.

* * * * *